US012781895B2

(12) United States Patent
Durieux

(10) Patent No.: US 12,781,895 B2
(45) Date of Patent: Nov. 3, 2026

(54) FEMALE ELEMENT FOR FLUIDIC CONNECTOR

(71) Applicant: STAUBLI FAVERGES, Faverges-Seythenex (FR)

(72) Inventor: Christophe Durieux, Gilly Sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 18/946,534

(22) Filed: Nov. 13, 2024

(65) Prior Publication Data

US 2025/0155062 A1 May 15, 2025

(51) Int. Cl.
*F16L 37/084* (2006.01)
*F16L 37/42* (2006.01)

(52) U.S. Cl.
CPC ........... *F16L 37/0841* (2013.01); *F16L 37/42* (2013.01)

(58) Field of Classification Search
CPC ...... F16L 37/138; F16L 37/0841; F16L 37/42
See application file for complete search history.

(56) References Cited

U.S. PATENT DOCUMENTS

| | | | | |
|---|---|---|---|---|
| 4,946,200 | A * | 8/1990 | Blenkush | F16L 37/138 |
| 5,489,125 | A * | 2/1996 | Hohmann | F16L 37/138 |
| 2004/0150223 | A1 * | 8/2004 | Campau | F16L 37/138 |
| 2020/0032922 | A1 | 1/2020 | Wilhelm | |

FOREIGN PATENT DOCUMENTS

WO WO-2008/074933 A1 6/2008

OTHER PUBLICATIONS

Search Report issued in FR 2312519, dated Apr. 16, 2024.

* cited by examiner

*Primary Examiner* — Zachary T Dragicevich
(74) *Attorney, Agent, or Firm* — MARSHALL, GERSTEIN & BORUN LLP

(57) ABSTRACT

This female element is provided for rapid fluidic connection to a nipple including a circumferential groove and comprises a latch with a tooth able to penetrate the circumferential groove of the nipple. The latch also comprises a passage ring, which surrounds the body, and which cooperates with surfaces of the body so that the ring is guided in translation relative to the body according to a locking axis. The latch comprises a tooth support, which presents an elongated shape and connects the tooth to the passage ring, the tooth being axially offset toward the front of the through-ring. The latch also comprises an actuation surface, which is located opposite the tooth relative to the body.

9 Claims, 12 Drawing Sheets

FEMALE ELEMENT FOR FLUIDIC CONNECTOR

FIELD

The present invention relates to a female element of a fluidic connector.

Generally speaking, a fluidic connection comprises a female element, which provides an orifice for receiving a complementary male element, the male element being called a nipple. The female element and the male element are provided to be coupled together so as to establish a fluidic connection, the fluidic connector being then in a coupled configuration. The female element generally comprises locking means, which are provided to hold the fluidic connector in the coupled configuration. Of particular interest here are female fluidic connector elements configured to be coupled to a compact nipple, in other words, a nipple including a cylindrical front part, and a circumferential groove located behind this cylindrical front part, the locking means cooperating with the circumferential groove to hold the fluidic connector in a coupled configuration.

From among the compact nipples, in particular the nipples with a so-called "turbo-compact" profile are known. Such a compact turbo nipple includes a front face, which is perpendicular to its longitudinal axis and delimits a cylindrical part by means of an entry chamfer. On the rear side, the cylindrical part joins a flange presenting a conical front part and a cylindrical rear part. A circumferential groove with straight sides is located at the front of this cylindrical part, close to the conical part.

Compact turbo nipples are often used on automotive engine test benches-hence their name, for the frequent connection and disconnection of hoses, tanks, etc. Compact turbo profile nipples are generally used in confined spaces, where handling, to connect or disconnect the connector is difficult. For example, compact turbo nipples are often attached to containers and are implemented in such a way that the circumferential groove is very close to a wall of this container, the wall then being perpendicular to the longitudinal axis of the nipple. This arrangement requires the locking means of the female element in the groove to be very close to the orifice of the female element, handling of the female element being impractical or even dangerous if the wall on which the compact turbo nipple is mounted is hot.

BACKGROUND

U.S. Pat. No. 4,541,457 discloses a female element including a latch with a tooth able to enter into a circumferential groove of a compact nipple. The latch is mounted radially on the body of the connector element, the latch being movable radially between an unlocked position and a locked position, with the tooth of the latch facing the front face of the body and pushed back into the locked position by a spring offset longitudinally from the tooth of the latch and interposed between an outer radial surface of the body and an inner surface of the latch.

WO-2008/074933-A1 describes a female connector configured to receive a male nipple comprising a circumferential flange. The female element comprises a locking ring, which provides a passage ring for the male nipple. This construction is compact, but access to the latch is very close to the orifice and is often obstructed. Manipulation of the locking means, particularly for disconnecting the connector, is not easy.

SUMMARY

It is these problems that the invention more particularly intends to remedy, by proposing a female element that is able to connect to a compact nipple while being more ergonomic.

To this end, the invention relates to a female element for rapid fluidic connection to a nipple including a circumferential groove, this female element comprising:

a body, which provides a fluid passage and comprises:

a distal part, from which the passage opens into an orifice configured to receive the nipple in a press-fit configuration of the nipple, the orifice defining a major axis of the body, a proximal part, which comprises means for securing to a fluid line, the distal part and the proximal part respectively defining a front side and a rear side of the body and of the female element, a latch, comprising:

a passage ring, which surrounds the body and, a tooth, which is able to enter the circumferential groove of the nipple, an actuation surface which is located opposite the tooth relative to the main axis, the latch being movable in translation according to a locking axis perpendicular to the main axis between a locking position, in which the tooth enters the circumferential groove of the nipple in a press-fit configuration, and a retracted position, in which the tooth does not enter the circumferential groove, means for returning the latch to its locking position, wherein:

the latch comprises a tooth support, which is arranged outside the body, which presents an elongated shape with a first end, by means of which the tooth support is connected to the passage ring, and a second end, by means of which the tooth support is connected to the tooth, the tooth being offset axially toward the front of the passage ring, the actuation surface extends along the main axis toward the rear of the passage ring, the passage ring comprises a proximal face, which extends in a plane perpendicular to the main axis and is oriented toward the rear, the female element comprises a rear axial latch stop, which provides a distal face located facing the proximal face of the passage ring, the rear axial stop being configured to prevent axial displacement of the passage ring toward the rear of the body.

Thanks to the invention, the tooth and the actuation surface are axially offset relative to each other, the actuation surface being set back relative to the tooth. This facilitates latch actuation, in particular, when the female element is used in a crowded environment. The female element, and by extension the fluidic connector, are more ergonomic.

According to advantageous but non-mandatory aspects of the invention, such a female element may incorporate one or more of the following features taken alone or in any technically permissible combination.

The tooth comprises a proximal face and a distal face, which is oriented opposite from the proximal face, and which is perpendicular to the main axis, while the proximal face of the tooth is located facing a distal face of the body, and the distal face of the tooth constitutes an end face of the female element.

The body provides a front axial stop, which is located facing the distal face of the latch stop, while the passage ring comprises a distal face, which is oriented opposite from the proximal face of the passage ring and which cooperates with the front axial stop of the body in such a manner as to prevent axial displacement of the passage ring toward the front of the body.

The latch and the body are shaped so as to allow the latch to be inserted through a proximal end of the body, until the passage ring bears against the front axial stop of the body.

The passage ring comprises two support arms for joining the tooth to the actuation surface, the two support arms being located on either side of the body, while each support arm provides a bearing surface, the two bearing surfaces being located facing each other and being parallel to the locking axis and parallel to the main axis, that the body comprises two guide surfaces, which are provided on either side of the body, which are parallel to each other and which are each parallel to the main axis, and that each of the bearing surfaces is located facing a respective guide surface, the bearing and guide surfaces cooperating with each other in such a manner as to guide the latch between its locked position and its withdrawal position.

The body is monobloc, the distal and proximal parts being part of the same piece, while the rear axial latch stop is a stop ring, which is separate from the body and surrounds the body, and the body and rear axial stop are configured to allow the rear axial stop to be introduced from the rear of the body.

The stop ring provides a counter bearing surface, which is accessible from the outside of the female element and is fixed relative to the body and is located opposite the actuation surface relative to the main axis.

The female element comprises a pin, which is integral with the stop ring, while the pin provides a counter bearing surface, which is accessible from the outside of the female element, which is fixed relative to the body, and which is located opposite the actuation surface relative to the main axis.

The distal part and the proximal part are separate parts, which are assembled together to form the body, while the distal part forms the orifice of the connector and includes the front axial latch stop, and the proximal part forms the rear latch stop and comprises the means of securing to the fluid line.

The proximal part of the body provides a counter bearing surface, which is accessible from the outside of the female element and is fixed relative to the body and is located opposite the actuation surface in relation to the main axis.

The securing means defines a connection axis with the fluid line, while the connection axis is orthogonal to the main axis.

The connector comprises means for axially stopping the rear latch stop.

The female element comprises means for closing the fluid passage, the closing means including:

- a valve, which is movable in translation along the main axis between a forward closing position, in which the valve bears in a sealed manner against a body seat and closes the fluid passage, and a rear opening position, in which the valve does not close the fluid passage,
- a valve guide able to guide the valve in translation along the main axis, and
- a spring for returning the valve to its closed position, while the valve is configured to be pushed back by the nipple from the front closed position toward the rear open position during the introduction of the nipple into the orifice.

BRIEF DESCRIPTION OF THE DRAWINGS

The invention will be better understood, and other advantages thereof will become clearer, in the light of the following description of several embodiments of a female element, in accordance with its principle, given by way of example only and made with reference to the appended drawings, in which.

DESCRIPTION

Figure 1:
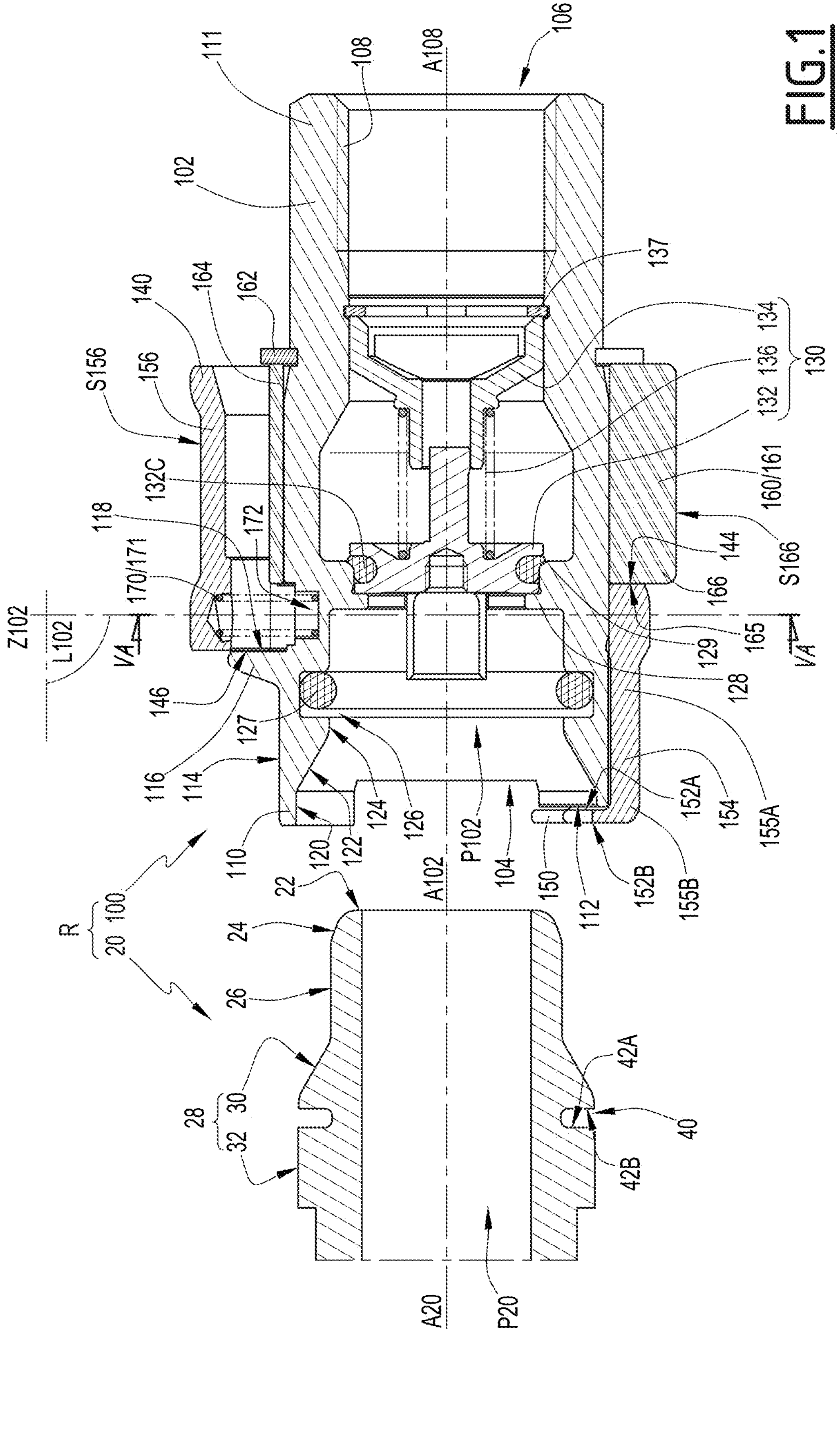
FIG. 1 is a longitudinal cross-section of a fluidic connector comprising a female element in accordance with a first embodiment of the invention, the fluidic connector being in an uncoupled configuration.

A connector R in accordance with a first embodiment of the invention is represented in FIG. 1. The connector R comprises a male element, the male element being a compact nipple 20, and a female element 100. For the purposes of this description, the compact nipple 20 is also referred to simply as the nipple 20. The connector R is represented here in an uncoupled configuration, the nipple 20 being positioned facing the female element 100. The nipple 20 is configured to be partially received in the female element 100, in a coupled configuration of the connector R, described later.

Figure 2:
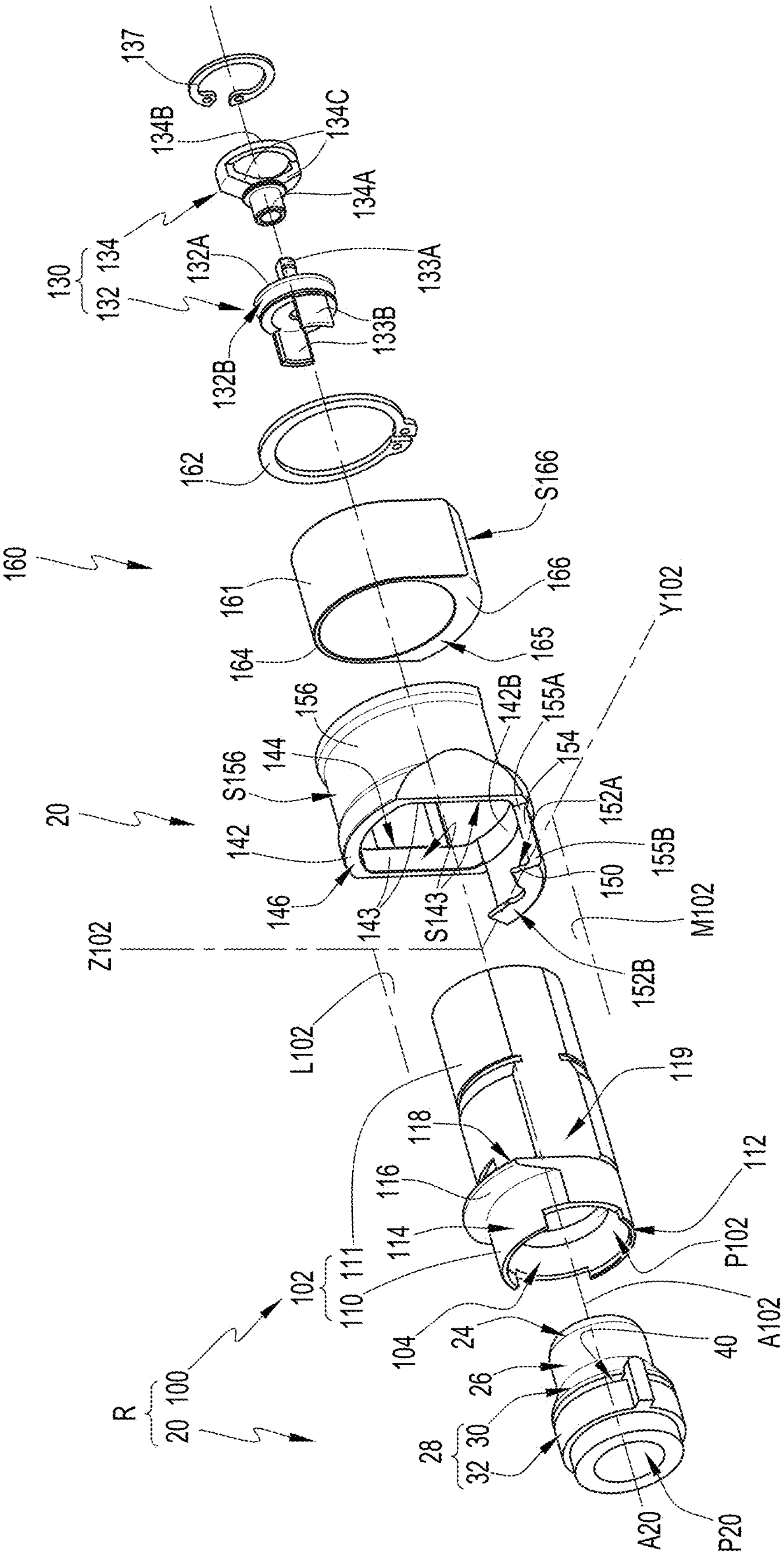
FIG. 2 is an exploded perspective view of the fluidic connector of FIG. 1.

First of all, the nipple 20 will be described, which can be seen in longitudinal cross-section in FIG. 1 and in perspective in FIG. 2.

The nipple 20 presents a general shape of revolution centered on a longitudinal axis A20. The nipple 20 is hollow and provides a fluid passage P20, which is centered on the longitudinal axis A20 and opens out from the nipple 20 by a front face 22 of the nipple 20. The fluid passage P20 defines an inner side of the nipple 20. The inner side is therefore oriented toward the longitudinal axis A20. An outer side of the nipple 20 is also defined as being a side oriented opposite from the inner side.

The front face 22 here, presents a ring shape and is located in a transverse plane of the nipple 20, in other words, a plane orthogonal to the longitudinal axis A20. The front face 22 is oriented toward the female element 100 of FIG. 1 and defines a front side, also known as the distal side, of the nipple 20. The nipple 20 also comprises a rear side, also known as the proximal side, which is located opposite the front side along the longitudinal axis A20.

Generally speaking, for a part comprising a front/distal side and a rear/proximal side, a distal surface (or face) of this piece designates a surface oriented toward the front side of this piece, while a proximal surface designates a surface oriented toward the rear side. Unless expressly stated otherwise, the orientations of the various parts are made with reference to the female element 100 in assembled configuration, as represented in FIGS. 1, 3*a*, 3*b*, 4 and 5.

In the example illustrated, the nipple 20 is a so-called "turbo compact" nipple, which comprises, on the outer side going from the front face 22 toward the rear of the nipple 20:
- an entry chamfer 24, which presents a frustoconical shape centered on the longitudinal axis A20 and diverging toward the rear of the nipple 20, then
- a first cylindrical part 26, which presents a circular profile, then
- a flange 28, which extends radially outward relative to the first cylindrical part, the first flange 28 including a conical front part 30 and a cylindrical rear part 32. The conical front part 30 is centered on the longitudinal axis A20 and diverges toward the rear of the nipple. The conical front part 30 is interposed between the first cylindrical part 26 and the cylindrical rear part 32.

The nipple 20 comprises a circumferential groove 40. The circumferential groove 40 is recessed in the nipple 20 and comprises a proximal flank 42A and a distal flank 42B, which are located facing each other. The distal flank 42B is preferably a straight flank, in other words, carried by a plane transverse to the longitudinal axis A20. In the illustrated example, both the distal flank 42B and the proximal flank 42A are straight flanks. Generally speaking, the circumferential groove 40 is located at the rear of the first cylindrical part 26. The circumferential groove 40 here, is recessed in the flange 28, the circumferential groove 40 being located in front of the cylindrical rear part 30 and close to the conical front part 30.

The female connector element 100 comprises a hollow body 102, which provides a fluid passage P102, the passage P102 opening out to the outside of the body 102 by an orifice 104, which is configured to receive the nipple 20 and which defines a front, or distal, side of the body 102, and by a rear opening 106. The rear opening 106 here comprises a threaded bore, which forms a means 108 for securing the body 102 to a fluid line. The fluid line is not represented. The connection means 108 defines a connection axis A108.

The passage P102 defines an inner side of the body 102 and, by extension, the female element 100. An outer side of the body 102 is also defined as being a side oriented opposite from the inner side.

The body 102 comprises a distal part 110, in which the orifice 104 is provided, the orifice 104 defining a main axis A102 of the body 102. In the first embodiment of the invention, the connection axis A108 is aligned with the main axis A102. The body 102 also comprises a proximal part 111, in which the rear opening 106 is provided and which comprises the securing means 108. The distal part 110 and the proximal part 111 respectively define a front side and a rear side of the body 102 and, by extension, of the female element 100.

In the first embodiment of the invention, the body 102 is monobloc, that is, the distal part 110 and the proximal part 111 are integral. In other words, the distal part 110 and the proximal part 111 are part of the same piece, preferably of metal. Alternatively, the distal and proximal parts are separate parts, which are assembled to form the body 102 of the female element, as described below with reference to the second and third embodiments of the invention.

The distal part 110 comprises a distal face 112, which is oriented toward the nipple 20 and delimits the orifice 104. The distal face 112 is a surface located in a plane perpendicular to the main axis A102.

In the illustrated example, the distal part 110 comprises, on the outer side of the body 102 going from the distal face 112 toward the rear of the body 102:
- an overhang 114, here providing a cylindrical surface,
- a front axial stop 116, here formed by a truncated flange, also referenced 116.

The front axial stop 116 here presents a generally symmetrical shape relative to a longitudinal plane L102 of the body 102, that is a plane comprising the main axis A102. A median plane M102 is defined as being a plane which comprises the main axis A102, and which is orthogonal to the longitudinal plane L102. A locking axis Z102 is defined as being an axis orthogonal to the median plane M102. A transverse axis Y102 is defined as being an axis orthogonal to the longitudinal plane L102. The main axis A102, the locking axis Z102 and the transverse axis Y102 form a right-angled trihedron.

The median plane M102 divides the body 102, and by extension the female element 100, into a high side and a low side, opposite the high side, the truncated flange 116 being located on the high side of the median plane M102. In the context of this description, the notions of high, low, right, left, etc., refer to the orientation of the pieces such as represented in the figures, although in reality this may be different.

The truncated flange 116, which is located on the upper side of the body 102, is limited by two lateral planes, which are parallel to each other and extend along the main axis A102. The two lateral planes truncating the flange 116 are parallel to the longitudinal plane L102. The truncated flange 116 presents a distal stop face 118, which is perpendicular to the main axis A102 and is oriented toward the rear of the body 102.

At the rear of the truncated flange 116, the outside of the body 102 presents a generally cylindrical shape providing two flats, which are arranged on either side of the body 102 symmetrically relative to the longitudinal plane L102 and which form two guide surfaces 119. The two guide surfaces 119 are thus symmetrical relative to the main axis A102 and parallel to the locking axis Z102.

In the illustrated example, the distal part 110 comprises, on the inner side of the body 102 going from the distal face 112 toward the rear of the body 102:

- a cylindrical bore portion 120, then
- a tapered portion 122, which converges toward the rear of the body 102, then
- a cylindrical portion 124, which is provided with an annular housing 126 provided to receive a gasket 127, the gasket 127 being intended to ensure the seal of the connection between the nipple 20 and the female element 100.

Advantageously, the body 102 provides a projection 128, which extends into the passage P102 projecting from the cylindrical portion 124 and which is located behind the annular housing 126. The projection 128 forms a front stop for the nipple 20 during the press-fitting of the nipple 20 into the passage P102. The nipple 20 is said to be in the press-fit configuration when the nipple 20 is received in the passage P102 and is in front abutment against the projection 128.

Figure 3:
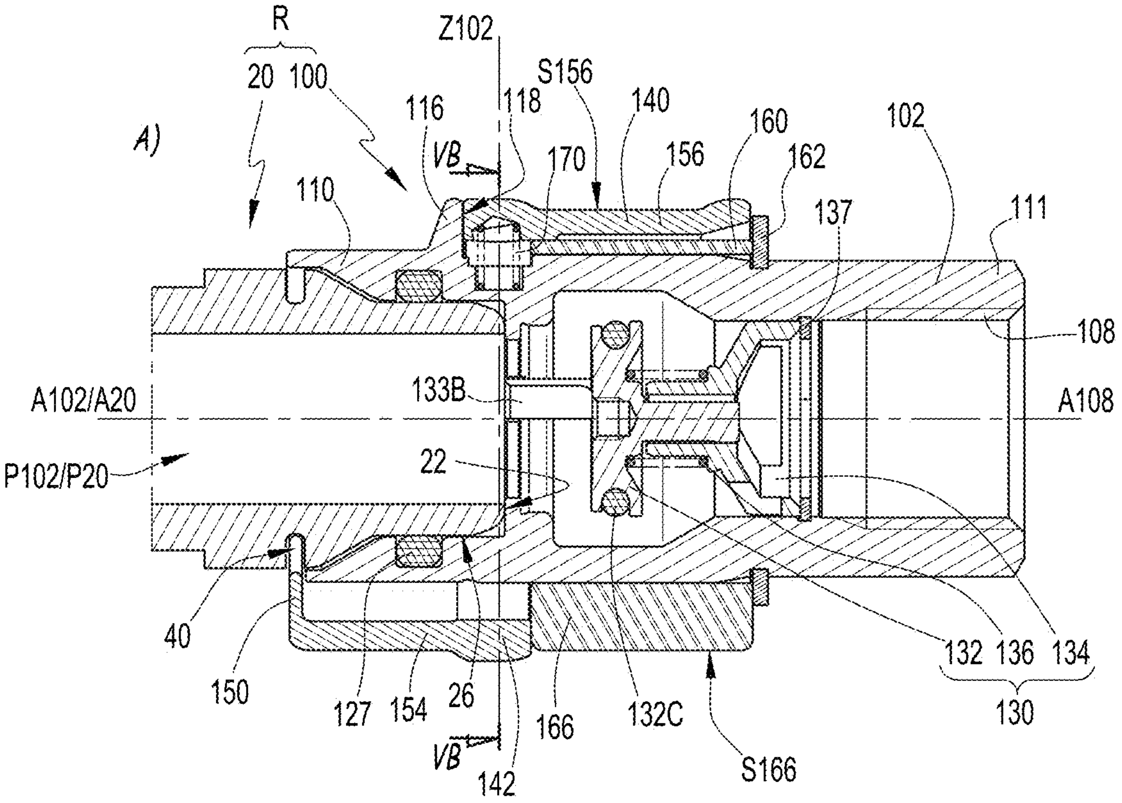
FIG. 3 represents, on two inserts a) and b) respectively, a cross-section of the fluidic connector of FIG. 1, according to a longitudinal plane L102 marked in FIG. 2, the fluidic connector being in an unlocked configuration and in a coupled configuration.
Figure 3:
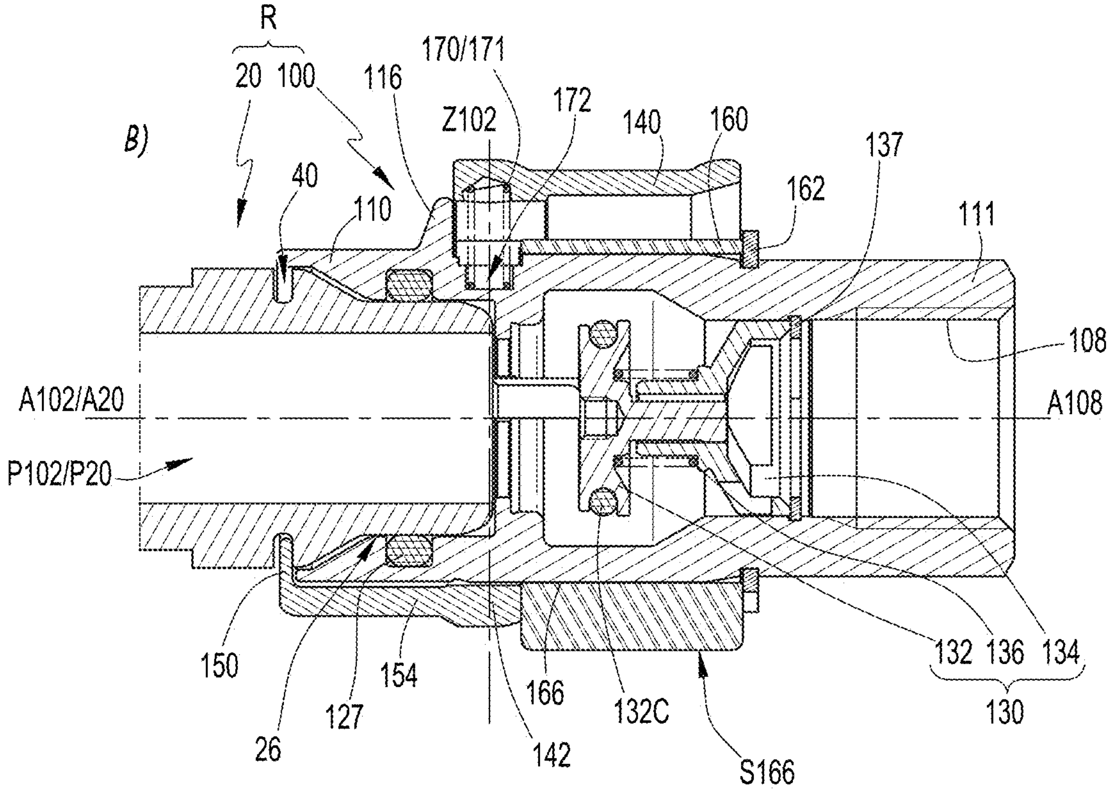
Figure 4:
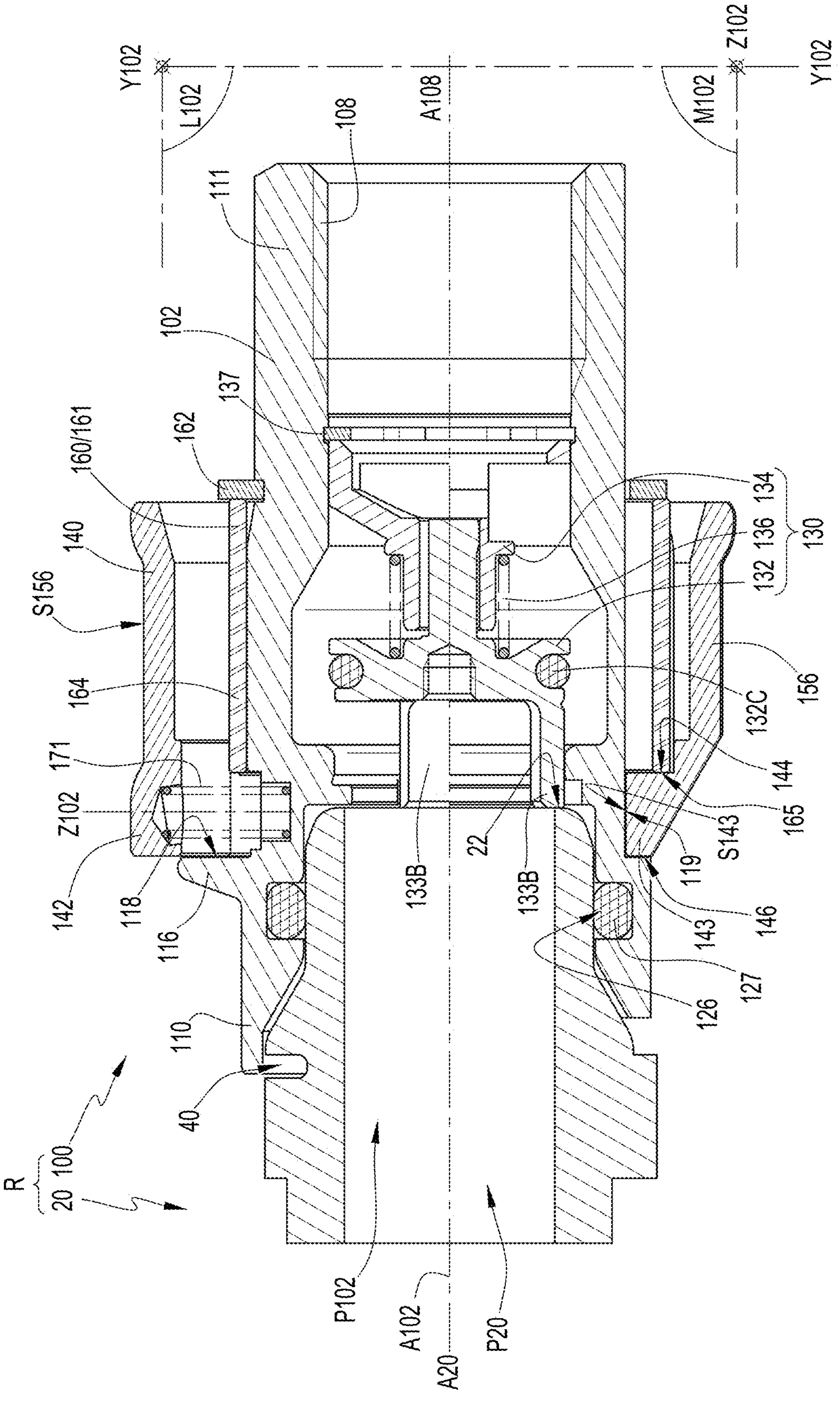
FIG. 4 is a broken cross-section, according to the longitudinal plane L102 and a median plane M102 marked in FIG. 2, of the fluidic connection of FIG. 1 in the coupled configuration.
Figure 5:
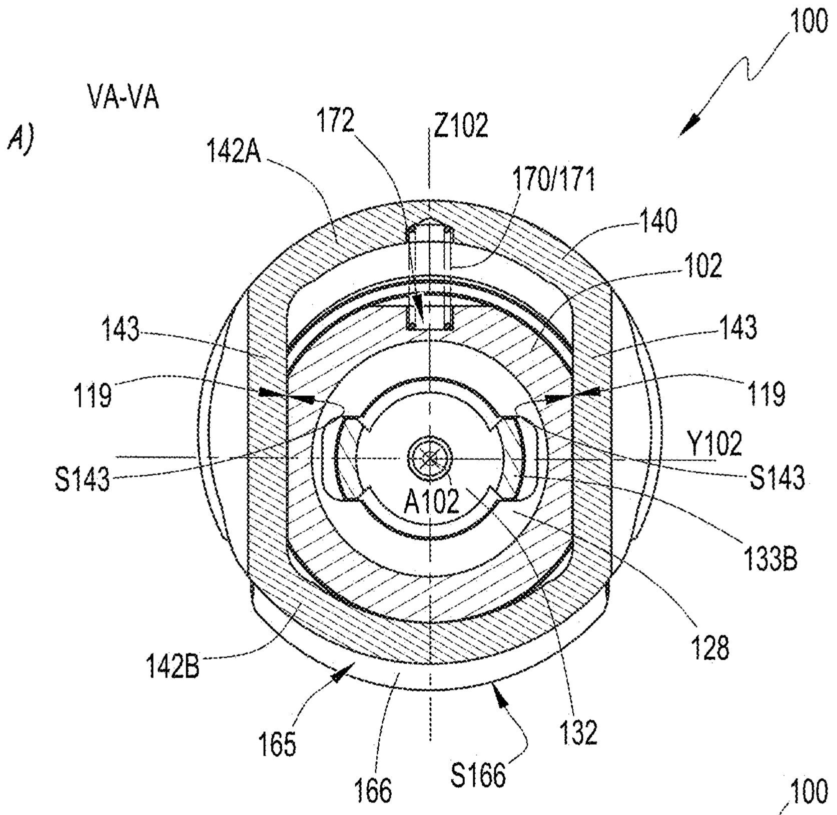
FIG. 5 represents, on two inserts a) and b) respectively, a transverse cross-section according to a plane VA-VA marked in FIG. 1 and according to a plane VB-VB marked in FIG. 3*a*), of the fluidic connector in the uncoupled configuration and in the unlocked configuration.
Figure 5:
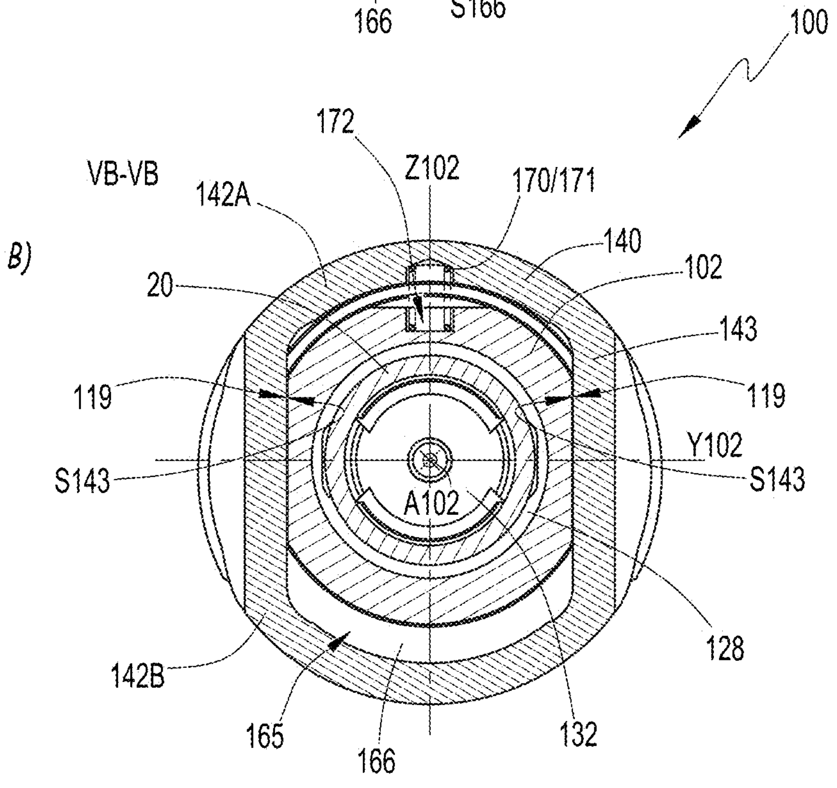

Advantageously, the projection 128 is an annular projection, which provides a seat 129 toward the rear of the body 102, which is configured to cooperate with the closing means 130 of the fluid passage P102. The closing means 130, which belong to the female connector element 100, here includes:

- a valve 132, which is movable in translation along the main axis A102 between a forward closed position, in which the valve 132 bears in a sealed manner against the seat 129 of the body 102 and closes the fluid passage P102, and a rear open position, in which the valve 132 does not close the fluid passage. When the valve 132 is in the forward closed position, the female element 100 is in a closed configuration, as illustrated in FIG. 1. When the valve 132 is in the rear open position, the female element 100 is in an open configuration, as illustrated in FIGS. 3 and 4.
- a valve guide 134, able to guide the valve 132 in translation along the main axis A102, and
- a return spring 136, which is configured to push the valve 132 from its rear open position toward its front closed position.

The valve 132 is configured to be pushed back by the nipple 20 from the front closed position toward the rear open position when the nipple 20 is introduced into the orifice 104.

The valve 132 here comprises a valve head 132A, which generally presents a circular shape about the main axis A102, and in which a circular groove 132B is provided to receive a seal 132C. The valve 132 also comprises a stem 133A, which extends in projection from a rear face of the valve head 132A and which presents a cylindrical shape centered on the main axis A102.

The valve guide 134 provides a tube 134A, which is centered on the main axis A102 and which is configured to cooperate, in particular by form fitting, with the valve stem 133A, so that the valve stem 133A slides in the tube 134A. The valve guide 134A is integral with the body 102, so that the valve 132 is guided in translation relative to the body 102 along the main axis A102.

In the first embodiment of the invention, the valve guide 134 is a separate part from the body 102. The valve guide 134 here comprises, in addition to the tube 134A, a ring 134B, which is centered on the main axis A102. The valve guide 134 also comprises tabs 134C, here two in number, which connect the tube 134A to the ring 134B. In the illustrated example, the tabs 134C are diametrically opposed relative to the main axis A102.

The ring 134B is in rear abutment against an internal stop 137, here formed by an internal circlip housed in a circular groove recessed in the fluid passage P102. The internal circlip is also referenced 137. The return spring 136 is here arranged around the tube 134A and the valve stem 133A, the return spring 136 acting between the rear face of the valve head 132A, and a face of the valve guide 134 turned toward the front. The return spring 136 thus pushes the valve 132 back toward its closed, front position, while maintaining the ring 134B in rear abutment against the internal circlip 137.

In one alternative, not represented, the ring 134B is also in front abutment against an internal shoulder of the fluid passage.

The valve head 132 here comprises extensions 133B, of which there are two here and which extend in projection from a front face of the valve head 132A parallel to the main axis A102 into the passage P102. When the valve 132 is in the front closed position, the extensions 133B extend in the direction of the orifice 104 beyond the annular projection 128. The extensions 133B are intended to cooperate with the nipple 20 during the press-fitting of the nipple 20 into the passage P102, the front face 22 of the nipple 20 pushing back the valve 132 by pressing on the extensions 133B, so that the valve 132 is in the rear open position when the nipple 20 is in abutment against the annular projection 128.

The female element 100 also comprises a latch 140. The latch 140 comprises a passage ring 142, which surrounds the body 102 when the female element 100 is in the assembled configuration.

The passage ring 142 provides a generally oblong passage, which extends along its length parallel to the locking axis Z102. The passage ring 142 here comprises an upper portion 142A, a lower portion 142B, and two support arms 143. The upper portion 142A here presents an arcuate shape and is located on the upper side of the body 102 when the female element 100 is assembled. The lower portion 142B here presents an arcuate shape and is located on the lower side of the body 102. The upper 142A and lower 142B portions are thus located on either side of the median plane M102. The two support arms 143 are located on either side of the longitudinal plane L102, in other words, are located on either side of the body 102, and connect the upper portion 142A to the lower portion 142B.

Each arm 143 provides a bearing surface S143, the two bearing surfaces S143 being located facing each other and being parallel to the locking axis Z102 and parallel to the main axis A102. In other words, the bearing surfaces S143 are each parallel to the longitudinal plane L102.

Each of the bearing surfaces S143 is located facing a respective guide surface 119, the bearing S143 and the guide 119 surfaces cooperating with each other, in particular by surface cooperation, in a manner to limit the movements of the latch 140 to movements parallel to the longitudinal plane L102. In other words, the bearing S143 and the guide 119 surfaces cooperate to guide the latch between its locked position and its withdrawal position.

The passage ring 142 comprises a proximal face 144, which extends in a plane perpendicular to the main axis A102 and which is oriented toward the rear of the body 102 when the female element 100 is in the assembled configuration.

The passage ring 142 comprises a distal face 146, which is oriented opposite from the proximal face 144 of the passage ring 142. Thus, the distal face 146 extends in a plane perpendicular to the main axis A102 and is oriented toward the front of the body 102.

The distal face 146 cooperates with the front axial stop 116 of the body 102, in particular by surface cooperation, in a manner to prevent axial displacement of the passage ring 142 toward the front of the body 102. More precisely, the distal face 146 is in flat abutment against the distal stop face 118, in a manner to limit movements of the latch 140 to movements parallel to a plane orthogonal to the main axis A102.

The female connector element 100 also comprises a rear axial stop 160, which is configured to prevent axial displacement of the passage ring 142 toward the rear of the body 102. The rear axial stop 160 ensures that the latch 140 stops at the rear according to the main axis A102. Thus, the rear axial stop 160 serves to keep the distal face 146 of the ring 142 in abutment against the face of the distal stop 118 of the body 102. In the first embodiment, the rear axial stop 160 is formed by a stop ring 161, which is separate from the body 102 and is stopped here by means of an external circlip 162. The stop ring 161 is described later.

It is understood that the cooperation of the surfaces of the passage ring 142, the bearing surface S143 and the distal surface 146, with the surfaces of the body 102, the guide surfaces 119 and the distal stop face 118, limits the movements of the latch 140 relative to the body 102 to the movements in translation parallel to the locking axis Z102.

The passage ring 142 provides a generally oblong passage, the largest dimension of which extends parallel to the locking axis Z102, so that the amplitude of the movement in translation of the passage ring 142, and by extension of the latch 140 relative to the body 102, is limited between an upper position, known as the "locked position", in which the lower portion 142B of the passage ring 142 abuts against the rest of the female element 100, and a lower position called the "withdrawal position", in which the upper portion 142A of the passage ring 142 abuts against the rest of the female element 100. Thus, the bearing surfaces S143 and the guide surfaces 119 cooperate with each other so as to guide the latch 140 between its locked position and its withdrawal position.

When the latch 140 is in the locked position, the female element 100 is said to be in the locked configuration, as illustrated in FIGS. 1, 3*b*, 4 and 5*a*. When the latch 140 is in the withdrawal position, the female element 100 is said to be in the withdrawal configuration, as illustrated in FIGS. 3*a* and 5*b*.

The latch 140 also comprises a tooth 150, which is able to penetrate the circumferential groove 40 of the nipple 20. The tooth 150 and the circumferential groove 40 are positioned so that when the nipple 20 is in the press-fit configuration, and the latch 140 is in the locked position, then the tooth 150 is received in the circumferential groove 40, preventing the nipple 20 from being withdrawn from the passage P102. When the nipple 20 is in the press-fit configuration and the latch 140 is in the withdrawal position, the tooth 150 does not enter the groove 40 and does not prevent the nipple 20 from being withdrawn from the passage P102.

In the first embodiment of the invention, the latch 140 is made in a single piece. In particular, the tooth 150 is integral with the rest of the latch 140.

The tooth 150 is located at a distance from the passage ring 142 and presents a flattened shape, extending according to a plane orthogonal to the main axis A102. The tooth 150 comprises a proximal face 152A, which is oriented toward the passage ring 142, and a distal face 152B, which is oriented opposite from the proximal face 152A. In other words, the proximal face 152A is oriented toward the rear of the female element 100 in the assembled configuration. The proximal face 152A of the tooth 150 is located facing the distal face 112 of the body 102.

The proximal face 152A is configured to cooperate, in particular by surface cooperation, with the distal flank 42B of the circumferential groove 40. In particular, the proximal face 152A is perpendicular to the main axis A102.

Preferably, the distal face 152B is parallel to the proximal face 152A. The distal face 152B is preferably perpendicular to the main axis A102.

The tooth 150 is received in a recess in the distal face 112 of the body 102, in such a way that the distal face 152B of the tooth 150 is accessible from outside the female element 100. In other words, the distal face 152B of the tooth 150 advantageously constitutes an end face of the female element 100, in particular a front end face of the female element 100.

The latch 140 also comprises a tooth support 154, which is arranged outside the body 102 in the assembled configuration of the female element 100. The tooth support 154, also known simply as the support 154, presents an elongated shape that extends along the main axis A102. Here, the support 154 presents a generally cylindrical shape with an arcuate cross-section. The support 154 comprises a first end 155A, by which the bracket 154 is connected to the passage ring 102, and a second end 155B, by which the support 154 is connected to the tooth 150. The tooth support 154 extends from the passage ring 102 toward the front of the body 102. Thus, the tooth 150 of the latch 140 is axially offset along the main axis A102 toward the front of the passage ring 142.

The latch 140 also includes an actuating clevis 156 for the latch 140. The actuating clevis 156 extends from the passage ring 142 toward the rear of the body 102. The actuating clevis 156 here presents a generally cylindrical shape with an arcuate cross-section and extends from the passage ring 142 toward the rear of the body 102.

The actuating clevis 156 provides an actuation surface S156, which extends along the main axis A102 from the passage ring 102 toward the rear of the female element 100. The actuation surface S156 is generally parallel to the main axis A102 and presents a normal which is generally parallel to the locking axis Z102, and which here is oriented upward. The tooth 150 of the latch 140 is axially offset, along the main axis A102, relative to the actuation surface S156.

The actuation surface S156 extends from the upper portion 142A of the passage ring 142 toward the rear of the body 102, while the tooth support 154 connects the tooth 150 to the lower portion 142B of the passage ring 142. Thus, the actuation surface S156 is located opposite the tooth 150 relative to the main axis A102. The two support arms 143 of the passage ring 142 join the support 154 to the actuation surface S156.

When the nipple 20 and the female element 100 are connected, the female element 100 does not project axially from the circumferential groove 40 of the nipple 20. Disconnection of the connector R is very accessible, as the actuation surface S156 is offset toward the rear of the female element 100.

The female element 100 also comprises return means 170, which is configured to return the latch 140 to its locking position. The return means 170 is realized here by a compression spring 171, which is interposed between the upper portion 142A of the passage ring 142 and the body 102. One end of the compression spring 171 is received in a housing 172, which is provided in the body 102 and holds the compression spring in position relative to the body 102, so that the compression spring 171 acts according to a direction substantially parallel to the locking axis Z102 to return the latch 140 to its locked position.

The stop ring 161, which forms the rear axial stop 160, is now described.

In the first embodiment, the stop ring 161 is realized in one piece. The stop ring 161 surrounds the body 102, in particular the rear part of the body 102, and is configured to be put in position by the rear of the body 102. Here, the stop ring 161 presents an annular portion 164, which extends according to the main axis A102 and on which is provided a lower bulge, which extends radially to the main axis A102 and forms a cleat 166.

The stop ring 161 provides a distal face 165, which extends in a plane orthogonal to the main axis A102. In the assembled configuration of the female element 100, the distal face 165 of the stop ring 161 is located facing the proximal face 144 of the passage ring 142, in such a manner as to prevent axial displacement of the passage ring 142, and by extension, of the latch 140, toward the rear of the body 102.

The cleat 166 presents a so-called counter bearing surface S166, the counter bearing surface S166 being generally parallel to the main axis A102 and presents a normal which is generally parallel to the locking axis Z102, and which is here oriented downward.

The counter bearing surface S166 is thus oriented opposite from the actuation surface S156. More generally, the counter bearing surface S166 is opposite the actuation surface S156 with respect to the main axis A102.

When the female element 100 is in the assembled configuration, the stop ring 161 is partially covered by the actuating clevis 156, the cleat 166 emerging from the actuating clevis 156. In particular, the counter bearing surface S166 emerges from the actuating clevis 156 and remains accessible from outside the female element 100.

The cleat 166 cooperates with the actuating clevis 156, in particular by cooperation of form, in such a manner as to prevent rotational movements of the stop ring 161 relative to the body 102 about the main axis A102. Thus, the stop ring 161, and in particular the counter bearing surface S166, are fixed relative to the body 102.

The operator can thus maneuver the latch 140, between the locked and the withdrawal positions of the latch 140 and against the return means 171, by simultaneously pressing on the actuation surface S156 and the counter bearing surface S166 of the rear axial stop 160.

In the first embodiment, the counter-bearing surface S166 is a surface of the stop ring 161. In other alternative embodiments described later, the counter bearing surface is provided in another way, in particular a surface provided by the body 102.

The assembly of the female element 100 is now described. The assembly of the female element 100 comprises the following steps.

Preferably, the internal elements of the female element 100 are fitted first:

Place the gasket 127 in the annular housing 126.

Place the closing means 130 into the body 102. To do this, thread the valve 132, the return spring 136, the valve guide 134 and the internal circlip 137 through the rear of the passage P102.

Figure 6:
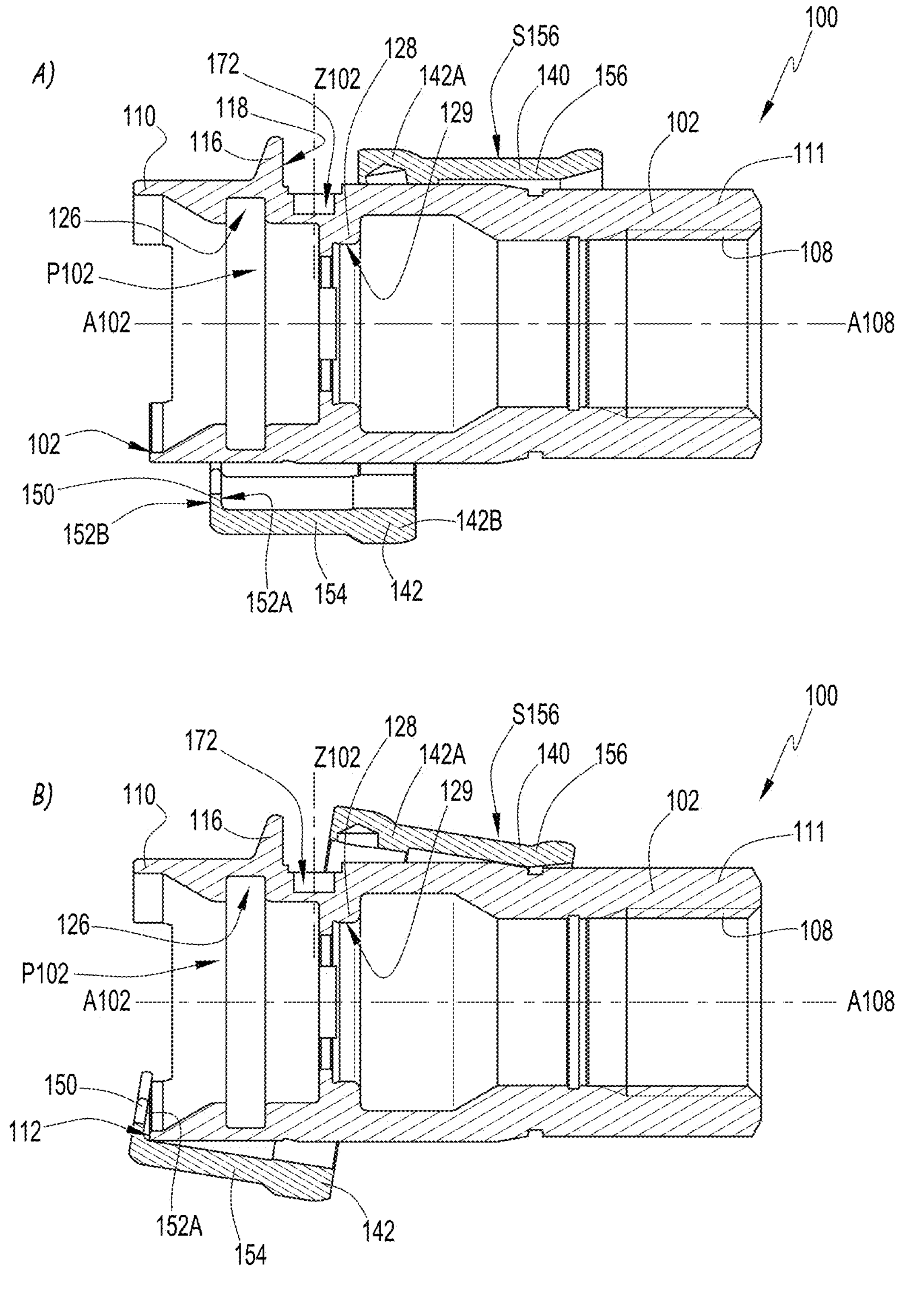
FIG. 6 represents, on two inserts a) and b) respectively, a longitudinal cross-section of a body and a latch belonging to the female element of FIG. 1, the body and the latch being represented in two successive configurations during assembly of the female element.

Thread the latch 140 through the rear of the body 102, as illustrated in FIGS. 6*a* and 6*b*, until the latch 140 abuts against the truncated flange 116 of the body 102, more precisely, until the passage ring 142 is in abutment against the front axial stop 116 of the body 102.

The proximal face 152A of the tooth 150 then faces the distal face 112 of the body 102. Then, as illustrated in FIG. 6*b*, tilt the latch relative to the body 102 while keeping the proximal face 152A of the tooth 150 facing the distal face 112 of the body 102, in such a manner as to free access to the housing 172, and allow the spring 171 to be fitted. Next, replace the latch 140 against the flange 116.

Next, fit the rear axial stop 160 to prevent the movement in translation of the latch toward the rear of body 102. To do this, thread the stop ring 161 through the rear of the body 102, under the actuating clevis 156, the cleat 166 being located opposite the actuation surface S156 relative to the main axis A102, until the stop ring 161 abuts against the latch 140. Then axially immobilize the stop ring 161 by fitting the external circlip 162.

The coupling of the connector R is now described.

To couple the female element 100 and the nipple 20, first align the main axis A102 of the female element 100 and the longitudinal axis A20 of the nipple 20, the front face 22 of the nipple 20 being oriented toward the orifice 104 of the female element 100. The connector R is then in the configuration of FIG. 1.

The nipple connector 20 is then brought closer to the female element 100 along the main axis A102 according to a closing movement.

During the closing movement, the conical front part 30 of the flange 28 comes into contact with the tooth 150 and pushes the tooth 150 back, driving the latch 140 from its locked position toward its withdrawal position. It is understood that the tooth 150 rubs against the outer surface of the nipple 20.

The first cylindrical part 26 of the nipple cooperates with the gasket 127 of the female element 100, ensuring the seal of the connector R. Then, the end of the nipple 20 comes into contact with the extensions 133B of the valve head 132, driving the valve 132 toward its open position.

The closing movement continues until the nipple 20 comes into abutment against the projection 128. The connector R is then in the configuration of FIG. 3*a*.

When the tooth 150 of the latch 150 reaches the circumferential groove 40 of the nipple 20, the tooth 150 enters the circumferential groove 40 under the effect of the return spring 171 of the latch 140. The latch 140 thus returns to its locking position, as shown in FIG. 3*b*. The female element 100 and the nipple 20 are then connected and the fluid passage is free, the connector R being in the connected configuration.

From the connected configuration, to uncouple the connector R, it is necessary to actuate the latch 140 by pressing on the actuation surface S156 of the actuating clevis 156. The latch 140 thus moves from its locked position to the withdrawal position. The tooth 150 thus leaves the circumferential groove 40, as illustrated in FIG. 3*a*. By grasping the connector R between the actuation surface S156 and the counter bearing surface S166, the operator can easily actuate the latch 140.

It is then possible to move the nipple 20 away from the female element 100, by a movement away, which is a movement in translation parallel to the main axis A102. During this movement away, the valve 132, pushed back by the return spring 136, resumes its forward closed position.

Alternative embodiments of the invention are illustrated in FIGS. 7 to 12.

In the alternative embodiments of the invention, the elements similar to those in the other embodiments bear the same references and function in the same way. In the following, the main differences between each embodiment and the preceding one(s) are described.

Figure 7:
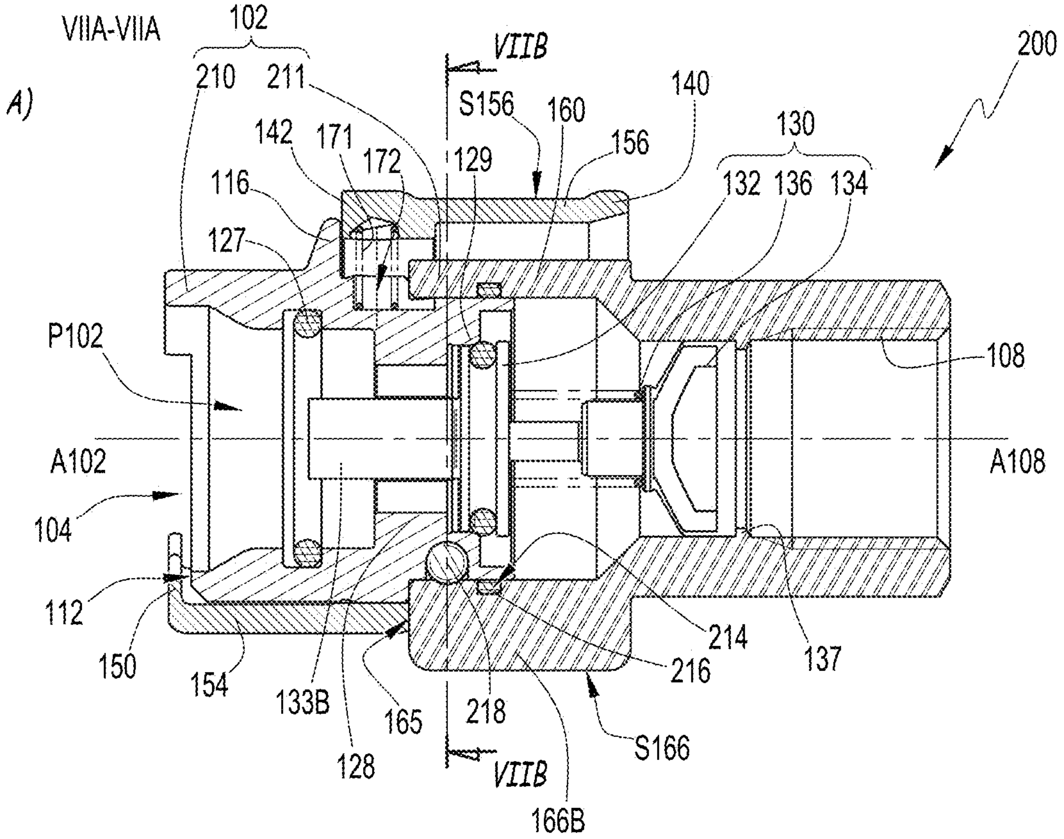
FIG. 7 represents, on two inserts a) and b) respectively, a longitudinal cross-section and a transverse cross-section of a female element in accordance with a second embodiment of the invention.
Figure 7:
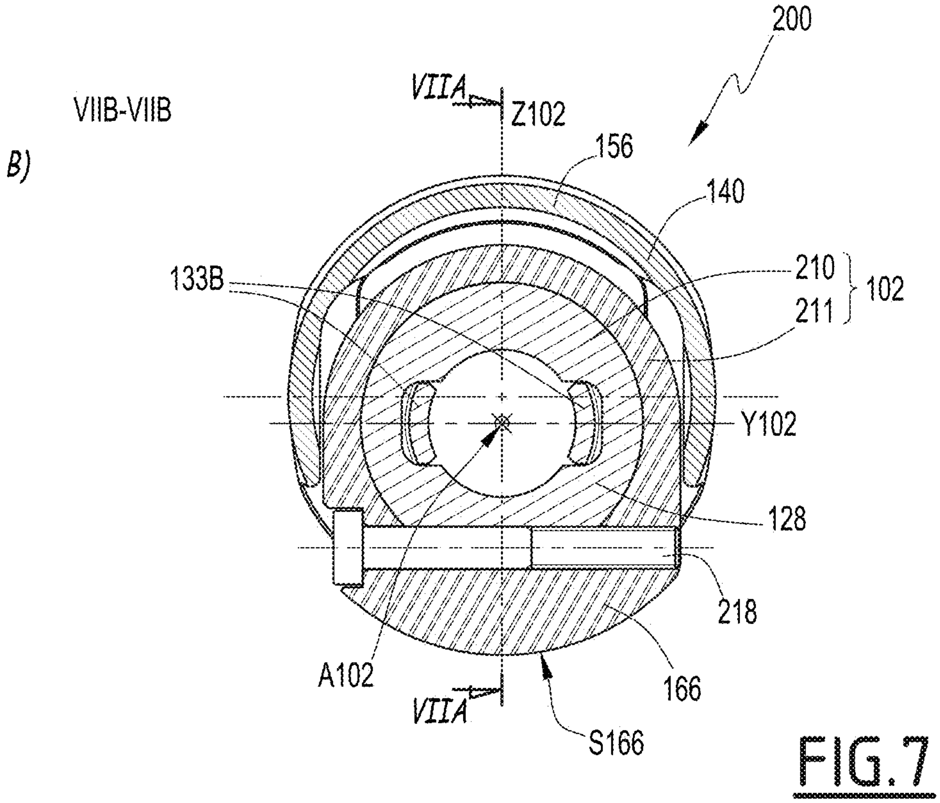
Figure 8:
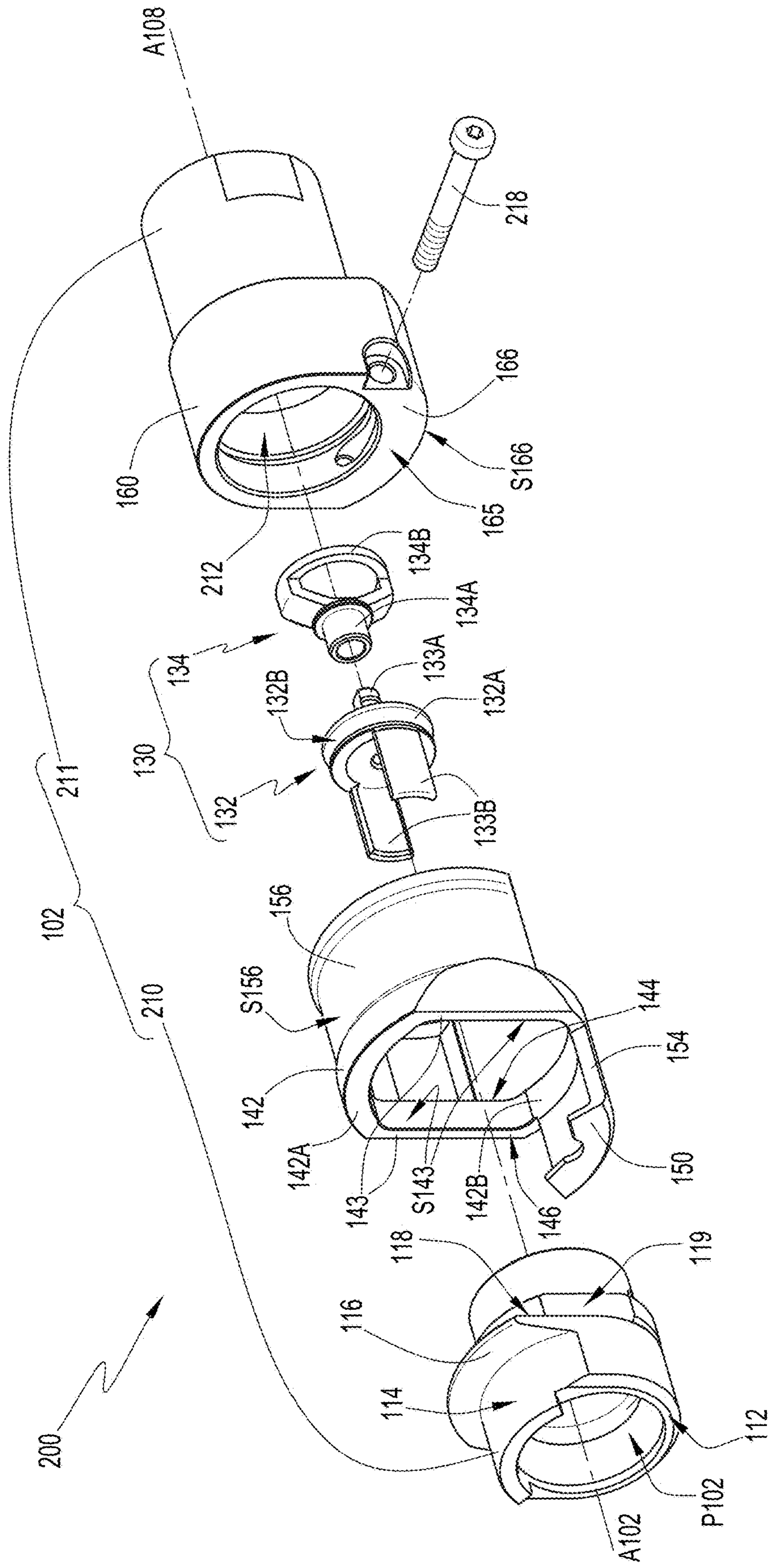
FIG. 8 is an exploded perspective view of the female element of FIG. 7.

A female element 200 in accordance with a second embodiment of the invention is represented in FIGS. 7 and 8.

One of the main differences with the first embodiment is that in the second embodiment, the body 102 of the female element 200 is formed of several parts assembled together. The body 102 is here formed of two parts, the two parts including a distal part 210 and a proximal part 211, which are separate parts and are assembled together to form the body 102 of the female element 200. The passage P102 is thus formed by the joining of a front portion, which is delimited by the distal part 210, and a rear portion, which is delimited by the proximal part 211 of the body 102.

The distal part 210 comprises the orifice 104, the flange 116, the spring housing 172 and the valve seat 129. The proximal part 211 comprises the rear axial latch stop 160 and the securing means 108 for the fluid line. The distal face 165, the cleat 166 and the counter bearing surface S166 are here, elements of the proximal part 211.

The distal face 165 defines a front side of the proximal part 211, in which a bore 212 for receiving the distal part 210 is provided. An internal groove 214 is recessed in the bore 212, the female element 200 also comprising a gasket 216, which is received in the internal groove and is provided to ensure a seal between the proximal part 211 and the distal part 210 when the distal part 210 is received in the bore 212.

The distal part 210 and the proximal part 211 are here secured by a screw 218, which allows the relative angular orientation of the distal part 210 relative to the proximal part 211 to be defined around the main axis A102.

In the second embodiment, the internal stop 137 is realized by means of a projection, which is part of the proximal part 211.

The assembly of the female element 200 is now described.

Preferably, first of all the gasket 127 is placed in the annular housing 126.

Pre-assemble the closing means 130 to the proximal part 211 of the body 102, in such a manner as to form a rear sub-assembly of the female element 200:

- by fitting the gasket 216 into the internal groove 214 of the bore 212 receiving the distal part 210 of the body 102,
- by threading, into the fluid passage P102 and from the front of the distal part 211, the valve guide 134, the valve return spring 136 and the valve 132.

Pre-assemble the latch 140 to the distal part 210, in such a manner as to form a front sub-assembly of the female element 200:

- by threading the latch 140 through the rear of the distal part 210, until the latch 140 abuts against the flange 116, more precisely until the passage ring 142 is in abutment against the front axial stop 116;
- then, by positioning the return spring 171 of the latch 140, by tilting the latch 140 relative to the distal part 210, inserting the return spring 171 into the housing 172 and replacing the latch 140 against the flange 116.

Next, assemble the front and rear sub-assemblies of the female element 200. To do this, bring the front and rear sub-assemblies of the female element 200 together, in such a manner as to insert the distal part 210 into the bore 212 of the proximal part 211 and form the passage P102. The gasket 216 provides a seal between the distal 210 and proximal 211 parts, while the valve 132 cooperates with the seat 129 to close the passage P102.

Next, secure the distal 210 and proximal 211 parts of the body 102 by fitting and tightening the screw 218. The female element 200 is now in the configuration of FIG. 7.

Figure 9:
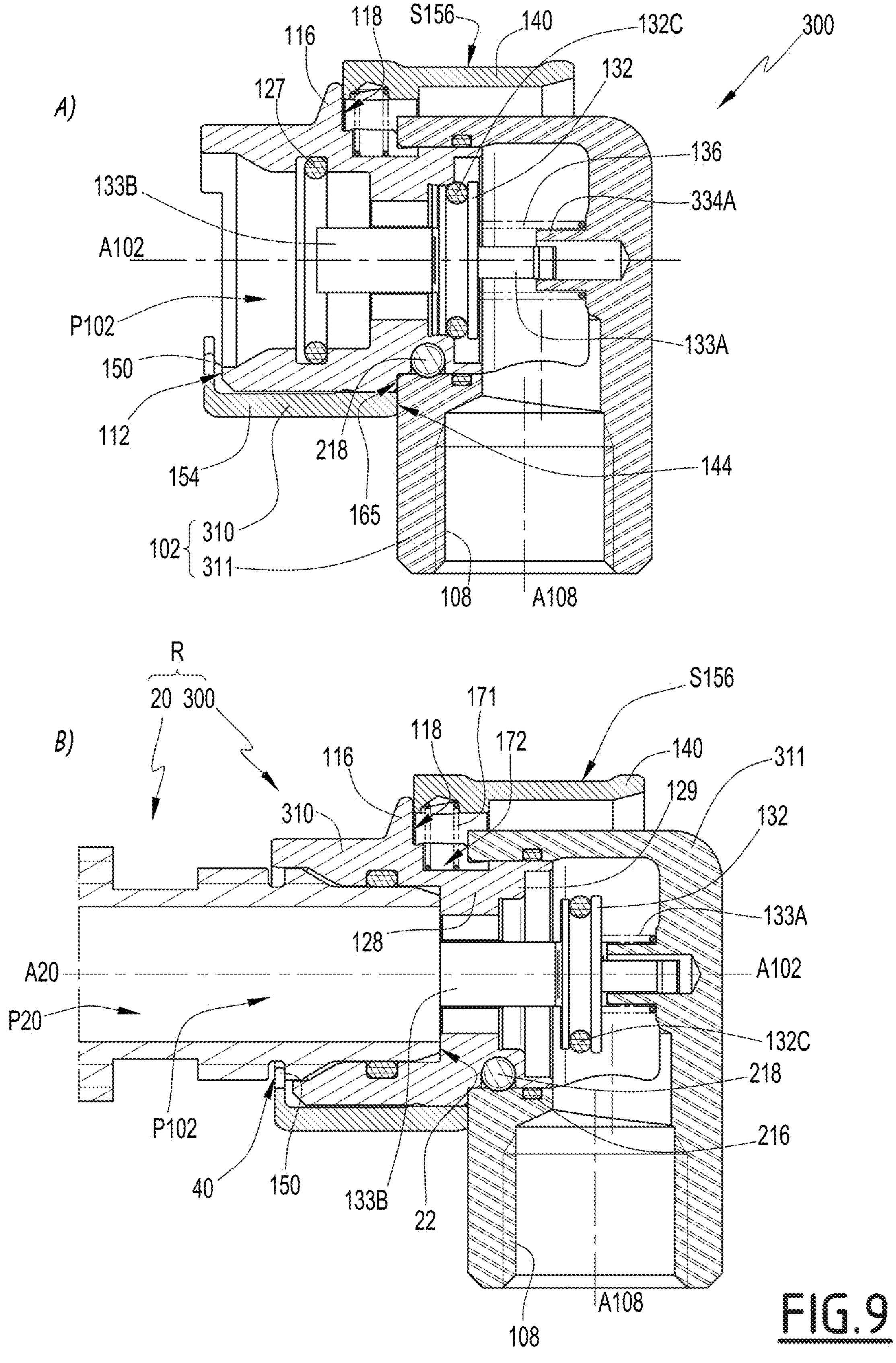
FIG. 9 represents, on two inserts a) and b) respectively, a longitudinal cross-section of a female element in accordance with a third embodiment of the invention, represented in an uncoupled configuration and in an unlocked configuration.

A female element 300 in accordance with a third embodiment of the invention is represented in FIG. 9.

As in the second embodiment, the body of the female element is realized in two parts, which include a distal part 310 and a proximal part 311 and are assembled by a screw 218.

The third embodiment differs from the second embodiment mainly in that the proximal portion 311 of the body includes means of securing 108 to a pipe which is arranged at right angles to the main axis A102. In other words, the proximal portion 311 of the body 102 is angled. More generally, the connection axis A108 intersects the main axis A102 and forms an angle with the main axis A102. Preferably, the connection axis A108 is orthogonal to the main axis A102.

Advantageously, the proximal part 311 also ensures the function of the valve guide. In the illustrated example, the proximal part 311 comprises a tube 334A, which extends in projection into the rear portion of the passage P102. The tube 334A is configured to cooperate, in particular by form-fit, with the valve stem 133A, so that the valve stem 133A slides in the tube 334A. In other words, the guide tube 334A of the valve stem 133A is integral with the proximal part 311.

Figure 10:
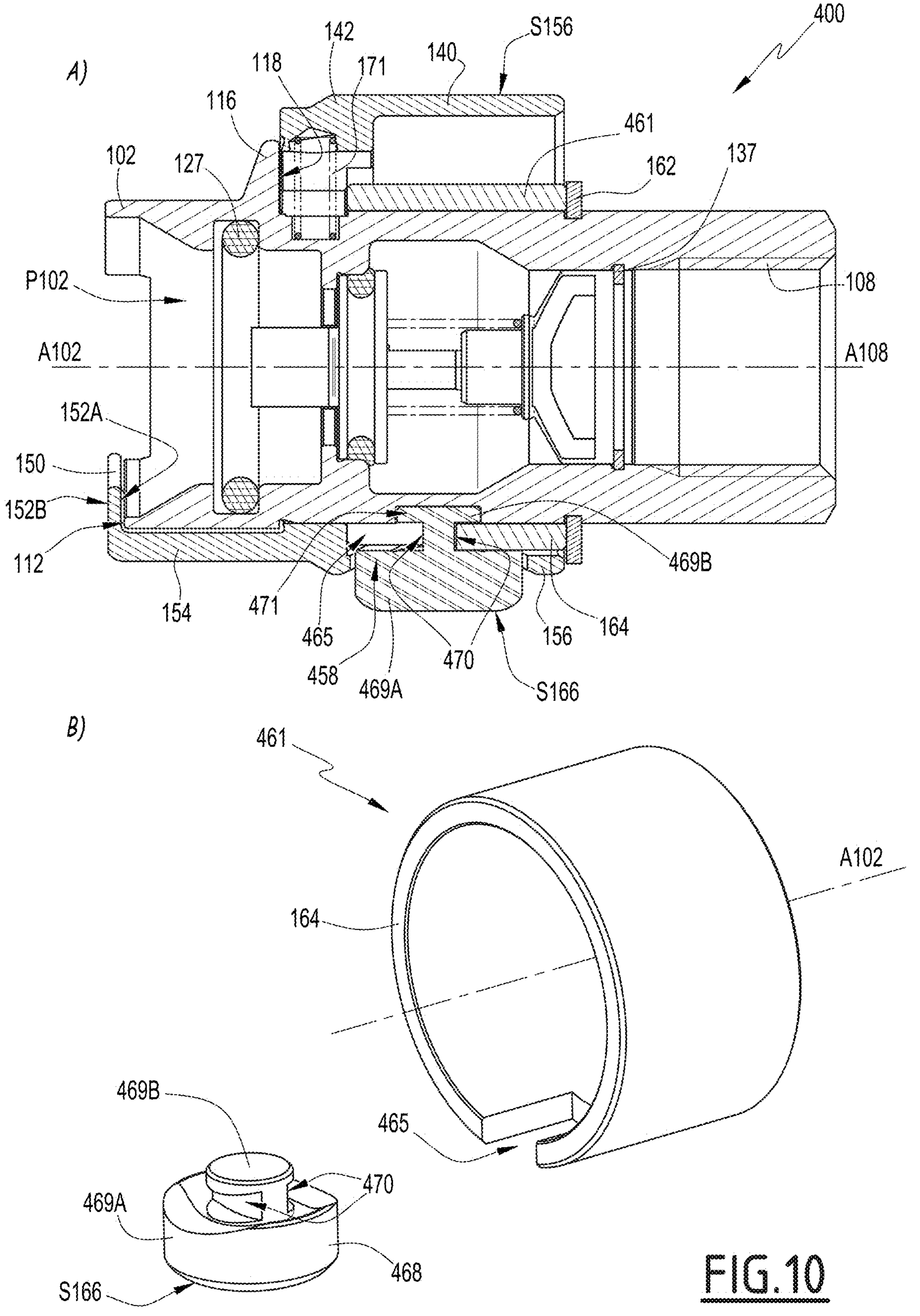
FIG. 10 represents two inserts a) and b) respectively, a longitudinal cross-section of a female element in accordance with a fourth embodiment of the invention and a perspective view of certain parts of the female element of insert a)

A female element 400 in accordance with a fourth embodiment of the invention is represented in FIG. 10. The female element 400 of the fourth embodiment resembles the female element 100 of the first embodiment in that the body 102 is monobloc.

The female element 400 of the fourth embodiment differs from the female element 100 of the first embodiment mainly in that:

- the actuating clevis 156 of the latch 140 is tubular and completely surrounds the body 102. The actuating clevis 156 presents a hole 458 in its lower part. The hole 458 is preferably cylindrical and is arranged opposite the actuation surface S156 relative to the main axis A102.
- the female element 400 comprises a stop ring 461, which is realized in several parts.

In the illustrated example, the stop ring 461 comprises, in addition to the annular portion 164, a pin 468, which projects from the annular portion 164 and which provides the counter bearing surface S166. The actuating clevis 156 surrounds the annular portion 164 of the locking ring 161, the hole 458 being arranged in such a manner as to allow the passage of the pin 468, the counter bearing surface S166 being accessible from outside the actuating clevis 166 whatever the position of the latch 140.

In the illustrated example, the pin 468 includes a lower cylinder 469A and an upper cylinder 469B, which are separated by at least one groove 470, here, two grooves. An axial slot 465 is provided in the annular portion 164, for the passage of the groove 470 of the pin 468. A housing 471 is provided in the body 102, to receive part of the upper cylinder 469B.

When the stop ring 461 is mounted, the pin 468 is fixed relative to the body 102. The end face of the lower cylinder 469A forms the counter bearing surface S166, which is accessible from outside the female element 400. The operator can then easily unlock the connector R by pressing simultaneously on the actuation surface S156 and the counter bearing surface S166.

Assembly of the female connector element 400 includes the following steps.

Preferably, the gasket 127 is first of all fitted in the annular housing 126.

Insert the closing means 130 into the body 102. To do this, thread the valve 132, the valve return spring 136, the valve guide 134 and the internal circlip 137 through the rear of the passage P102. Next, thread the latch 140 through the rear of the body 102, until the latch 140 abuts against the truncated flange 116 of the body 102, more precisely, until the passage ring 142 is in abutment against the front axial stop 116 of the body 102.

The proximal face 152A of the tooth 150 is then located facing the distal face 112 of the body 102. Then, as illustrated in FIG. 6*b*, tilt the latch relative to the body 102 while keeping the proximal face 152A of the tooth 150 facing the distal face 112 of the body 102, in such a manner as to free access to the housing 172, and allow the spring 171 to be fitted. Then replace the latch 140 against the flange 116. The housing 471 of the body 102 is now aligned, according to the locking axis Z102, with the hole 458 of the latch 140.

Next, fit the upper cylinder 469B of the pin 468 into the housing 471 of the body 102, then fit the rear stop ring 461 by threading it through the rear of the body 102 and under the actuating clevis 156 of the latch 140, until the stop ring 461 abuts the latch 140. The locking ring 461 is then immobilized axially by fitting the external circlip 162.

The stop ring 461 of the fourth embodiment is easier to manufacture than the stop ring 161 of the first embodiment.

Figure 11:
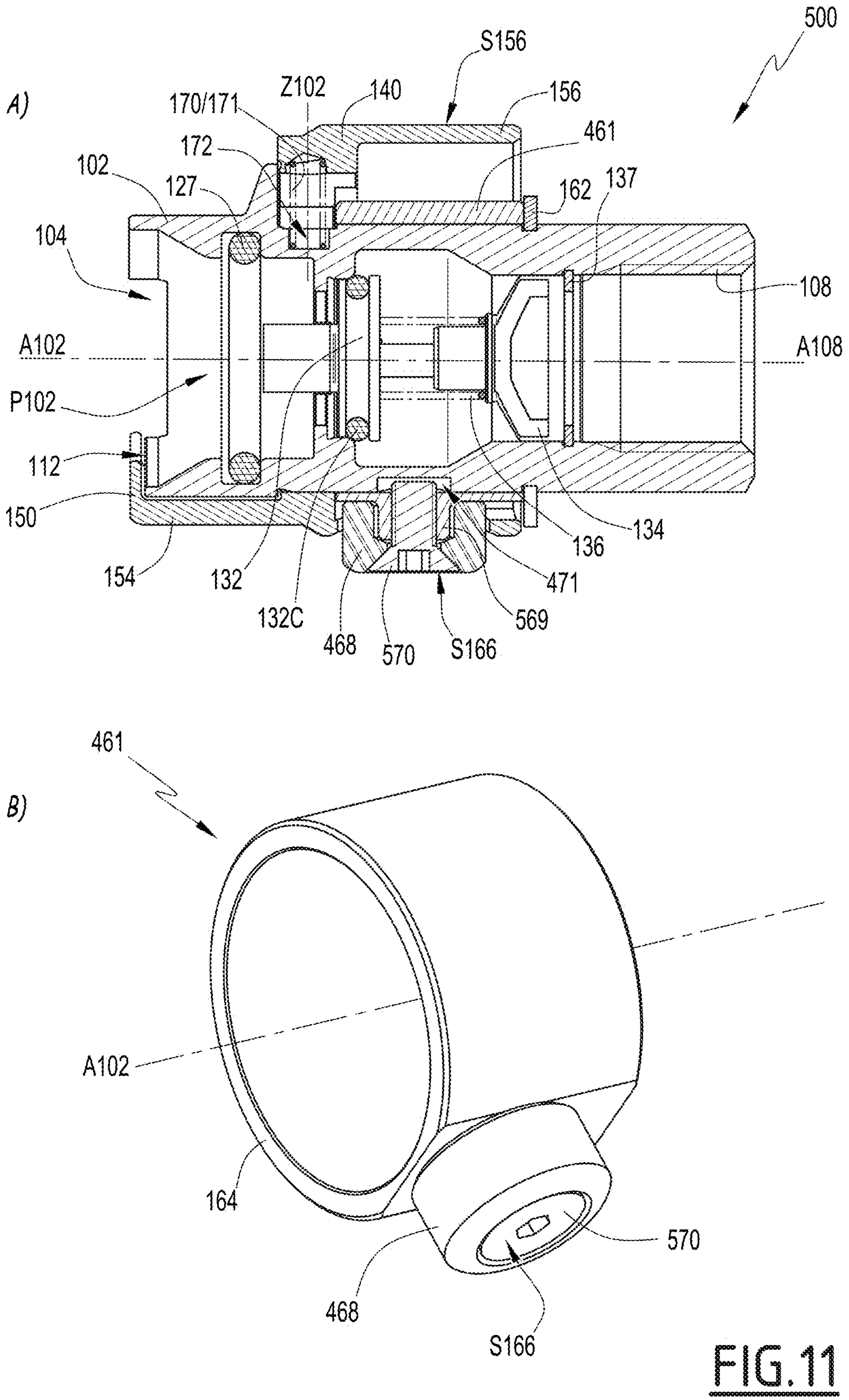
FIG. 11 represents, on two inserts a) and b) respectively, a longitudinal cross-section of a female element in accordance with a fifth embodiment of the invention and a perspective view of certain parts of the female element of insert a)

A female element 500 in accordance with a fifth embodiment of the invention is represented in FIG. 11.

The female element 500 in accordance with the fifth embodiment differs from the connector element 400 of the fourth embodiment of the invention mainly in that the stop ring 461 presents a stud 569, which is provided projecting from the annular portion 164, which extends radially to the main axis A102 and in which a threaded hole is provided, the pin 468 being screwed onto the stud 569 by means of a screw 570. The counter bearing surface S166 is here formed in part by a head of the screw 570 and by the pin 468.

The pin 468 is thus easily replaceable, without having to dismantle the rest of the female element 500.

Figure 12:
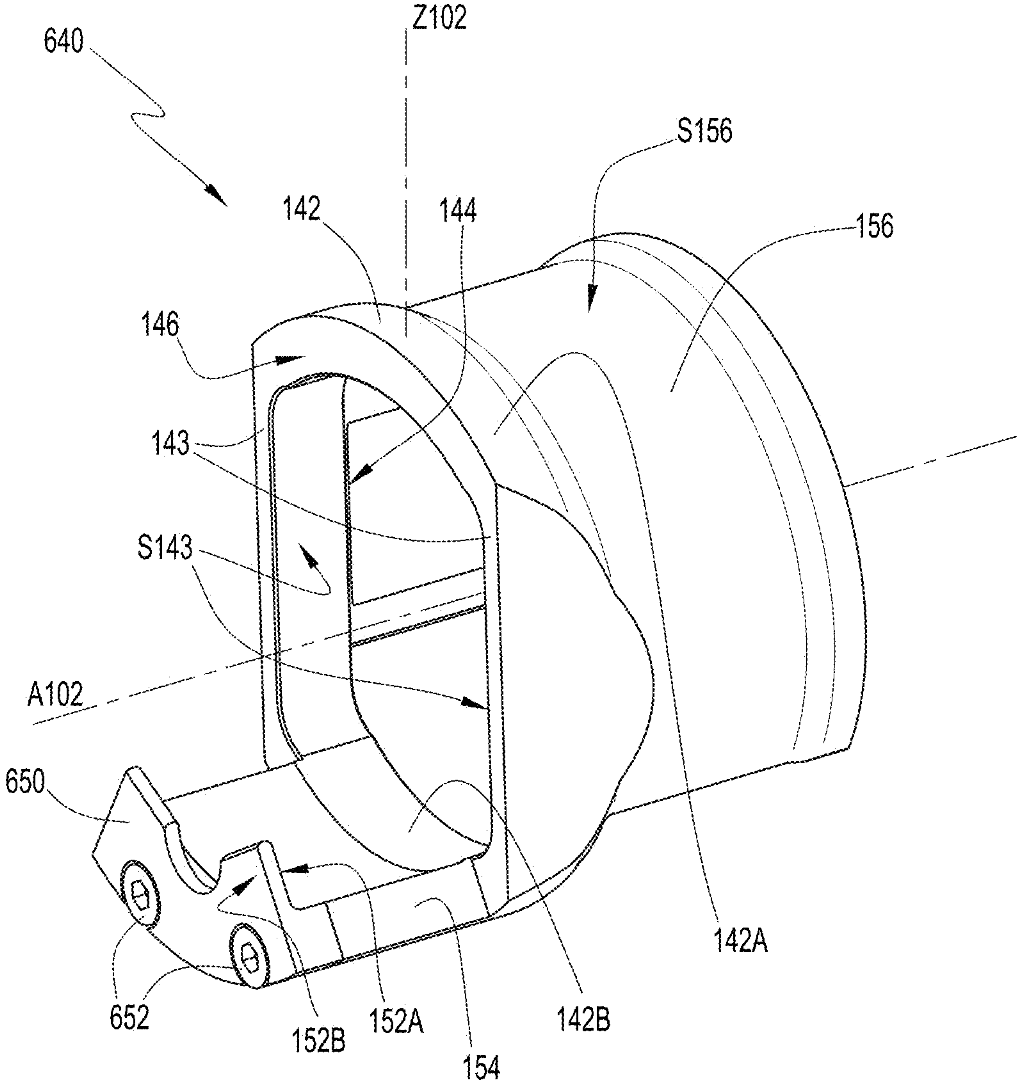
FIG. 12 is a perspective view of a latch belonging to a female element in accordance with a sixth embodiment of the invention.

A latch 640 belonging to a female element in accordance with a sixth embodiment of the invention is represented in FIG. 12.

In each of the preceding embodiments, the latch is monobloc, in other words, realized in one piece. In particular, the tooth 150 is integral with the rest of the latch 140. The latch presents a relatively complex shape. However, during each connection/disconnection cycle of the connector, the tooth rubs against the nipple 20 and tends to wear, which may lead to dismantling the female element in order to replace the latch.

In the sixth embodiment, the female element comprises a latch 640 with a tooth 650, which is an attachment to the rest of the latch 640, in particular the tooth 650 is fixed to the rest of the latch 640 by means of reversible fixing members, here by means of two screws 652. It is thus possible to replace the tooth 650 without having to dismantle the rest of the female element. A further advantage is that the latch 640 can be realized in two different materials, the tooth 650 preferably being in metal, to resist wear, while the rest of the latch 640 is preferably realized in a synthetic polymer material. Thus, the remainder of the latch 640 can be mass-produced by hot-injection molding, which is more economical and lighter than manufacturing the entire latch in metal.

In all the illustrated embodiments, the female element is provided for connection to a turbo-compact type nipple 20. The invention is of course not limited to this type of turbo-compact nipple but can also be applied to any type of nipple with a circumferential groove, such as a cylindrical tube with a simple straight-sided groove.

The above-mentioned embodiments and alternatives can be combined with one another to generate new embodiments of the invention.

What is claimed is:

1. A female element for rapid fluidic connection to a nipple including a circumferential groove, said female element comprising:

a body, which provides a fluid passage and comprises:

a distal part, from which the passage opens into an orifice configured to receive the nipple in a press-fit configuration of the nipple, the orifice defining a main axis of the body, a proximal part, which comprises securing means for connection to a fluid line, the distal part and the proximal part respectively defining a front side and a rear side of the body and of the female element, a latch, comprising:

a passage ring, which surrounds the body and, a tooth, which is able to penetrate the circumferential groove of the nipple, an actuation surface, which is located opposite the tooth relative to the main axis, the latch being movable in translation, by pressing the actuation surface, according to a locking axis perpendicular to the main axis between a locked position, wherein the tooth penetrates the circumferential groove of the nipple in the assembled press-fit configuration, and a withdrawal position, wherein the tooth does not penetrate the circumferential groove, means for returning the latch to its locked position, wherein:

the latch comprises a tooth support, which is arranged outside the body, which presents an elongated shape with a first end, by which the tooth support is connected to the passage ring, and a second end, by which the tooth support is connected to the tooth, the tooth being offset axially toward the front of the passage ring, the actuation surface extends along the main axis toward the rear of the passage ring, the passage ring comprises a proximal face, which extends in a plane perpendicular to the main axis and which is oriented toward the rear, the female element comprises a rear axial latch stop, which provides a distal face which is located facing the proximal face of the passage ring, the rear axial stop being configured to prevent axial displacement of the passage ring toward the rear of the body.

2. The female element according to claim 1, wherein:

the tooth comprises a proximal face and a distal face, which is oriented opposite from the proximal face, and which is perpendicular to the main axis, the proximal face of the tooth is located facing a distal face of the body, the distal face of the tooth constitutes an end face of the female element.

3. The female element according to claim 1, wherein:

the body provides a front axial stop, which is located facing the distal face of the latch stop, the passage ring comprises a distal face, which is oriented opposite from the proximal face of the passage ring and which cooperates with the front axial stop of the body in such a manner as to prevent axial displacement of the passage ring toward the front of the body.

4. The female element according to claim 3, wherein: the latch and the body are shaped so as to allow the latch to be inserted through a proximal end of the body, until the passage ring is in abutment against the front axial stop of the body.

5. The female element according to claim 1, wherein: the female element comprises axial stop means for the rear latch stop.

6. The female element according to claim 1, wherein: the female element comprises means for closing the fluid passage, the closing means including:

a valve, which is movable in translation along the main axis between a forward closing position, in which the valve is in abutment in a sealed manner against a seat of the body and closes the fluid passage, and a rear opening position, wherein the valve does not close the fluid passage, a valve guide able to guide the valve in translation along the main axis, and a spring for returning the valve to its closed position, the valve is configured to be pushed back by the nipple from the front closed position toward the rear open position during introduction of the nipple into the orifice.

7. A female element for rapid fluidic connection to a nipple including a circumferential groove, said female element comprising:

a body, which provides a fluid passage and comprises:

a distal part, from which the passage opens into an orifice configured to receive the nipple in a press-fit configuration of the nipple, the orifice defining a main axis of the body, a proximal part, which comprises securing means for connection to a fluid line, the distal part and the proximal part respectively defining a front side and a rear side of the body and of the female element, a latch, comprising:

a passage ring, which surrounds the body and, a tooth, which is able to penetrate the circumferential groove of the nipple, an actuation surface, which is located opposite the tooth relative to the main axis, the latch being movable in translation according to a locking axis perpendicular to the main axis between a locked position, wherein the tooth penetrates the circumferential groove of the nipple in the assembled press-fit configuration, and a withdrawal position, wherein the tooth does not penetrate the circumferential groove, means for returning the latch to its locked position, wherein:

the latch comprises a tooth support, which is arranged outside the body, which presents an elongated shape with a first end, by which the tooth support is connected to the passage ring, and a second end, by which the tooth support is connected to the tooth, the tooth being offset axially toward the front of the passage ring, the actuation surface extends along the main axis toward the rear of the passage ring, the passage ring comprises a proximal face, which extends in a plane perpendicular to the main axis and which is oriented toward the rear, the female element comprises a rear axial latch stop, which provides a distal face which is located facing the proximal face of the passage ring, the rear axial stop being configured to prevent axial displacement of the passage ring toward the rear of the body, wherein:

the passage ring comprises two support arms for joining the tooth support to the actuation surface, the two support arms being located on either side of the body, each arm provides a bearing surface, the two bearing surfaces being located facing each other and being parallel to the locking axis and parallel to the main axis, the body comprises two guide surfaces, which are provided on either side of the body, which are parallel to each other, and which are each parallel to the main axis, each of the bearing surfaces is located facing a respective guide surface, the bearing and guide surfaces cooperating with each other in such a manner as to guide the latch between its locked position and its withdrawal position.

8. A female element for rapid fluidic connection to a nipple including a circumferential groove, said female element comprising:

a body, which provides a fluid passage and comprises:

a distal part, from which the passage opens into an orifice configured to receive the nipple in a press-fit configuration of the nipple, the orifice defining a main axis of the body, a proximal part, which comprises securing means for connection to a fluid line, the distal part and the proximal part respectively defining a front side and a rear side of the body and of the female element, a latch, comprising:

a passage ring, which surrounds the body and, a tooth, which is able to penetrate the circumferential groove of the nipple, an actuation surface, which is located opposite the tooth relative to the main axis, the latch being movable in translation according to a locking axis perpendicular to the main axis between a locked position, wherein the tooth penetrates the circumferential groove of the nipple in the assembled press-fit configuration, and a withdrawal position, wherein the tooth does not penetrate the circumferential groove, means for returning the latch to its locked position, wherein:

the latch comprises a tooth support, which is arranged outside the body, which presents an elongated shape with a first end, by which the tooth support is connected to the passage ring, and a second end, by which the tooth support is connected to the tooth, the tooth being offset axially toward the front of the passage ring, the actuation surface extends along the main axis toward the rear of the passage ring, the passage ring comprises a proximal face, which extends in a plane perpendicular to the main axis and which is oriented toward the rear, the female element comprises a rear axial latch stop, which provides a distal face which is located facing the proximal face of the passage ring, the rear axial stop being configured to prevent axial displacement of the passage ring toward the rear of the body, wherein:

the body is monobloc, the distal part and the proximal part being part of the same piece, the rear axial stop of the latch is a stop ring, which is separate from the body and surrounds the body, the body and the rear axial stop are configured to allow the rear axial stop to be fitted from the rear of the body.

9. The female element according to claim 8, wherein: the stop ring provides a counter bearing surface, which is accessible from outside the female element, which is fixed relative to the body, and which is located opposite the actuation surface relative to the main axis.

* * * * *